United States Patent
Reinhart et al.

[11] Patent Number: 6,120,683
[45] Date of Patent: Sep. 19, 2000

[54] FILTER WITH SHUT-OFF VALVE

[75] Inventors: David Reinhart, Mt. Holly, N.C.; A. Richard Ayers, Bement, Ill.

[73] Assignee: Central Illinois Manufacturing Company, Bement, Ill.

[21] Appl. No.: 08/912,481

[22] Filed: Aug. 18, 1997

[51] Int. Cl.$^7$ ................................................. B01D 35/157
[52] U.S. Cl. .................. 210/100; 210/111; 210/430; 210/431; 210/440; 210/502.1
[58] Field of Search .................... 210/100, 111, 210/359, 418, 429–431, 440, 502.1, 109, 455; 55/422; 95/11; 96/398

[56] References Cited

U.S. PATENT DOCUMENTS

| | | | |
|---|---|---|---|
| 2,750,047 | 6/1956 | Hasbrouck | 210/440 |
| 3,117,925 | 1/1964 | Kasten | 210/96.1 |
| 3,339,735 | 9/1967 | Kasten | 210/100 |
| 4,623,560 | 11/1986 | Ayers . | |
| 4,959,141 | 9/1990 | Anderson . | |
| 5,122,264 | 6/1992 | Mohr et al. | 210/111 |

OTHER PUBLICATIONS

Promotional Material, Facet International, Fuel Guard Spin–on Filter—Monitors with Patented Shut–Off Feature, date Unknown.

*Primary Examiner*—Matthew O. Savage
*Attorney, Agent, or Firm*—Wood, Phillips, VanSanten, Clark & Mortimer

[57] ABSTRACT

A filter includes a housing having an inlet and an outlet. A filter core including a filter media is movably disposed within the housing with the inlet and the outlet in fluid communication with opposite sides of the core and a pressure responsive surface in fluid communication with said inlet. The filter also includes a valve supported on the filter core and moveable into a sealing position to prevent fluid from passing to the outlet when said core moves within said housing response to fluid pressure acting against said pressure responsive surface.

10 Claims, 1 Drawing Sheet

FILTER WITH SHUT-OFF VALVE

CROSS-REFERENCE TO RELATED APPLICATIONS

Not applicable.

STATEMENT REGARDING FEDERALLY SPONSORED RESEARCH/DEVELOPMENT

Not applicable.

BACKGROUND OF THE INVENTION

1. Technical Field

This invention relates to an apparatus for removing contaminants from a fluid, and in particular, for removing contaminants from a fluid while providing an indication when the apparatus is saturated with contaminants.

2. Background Art

Filters of various sorts have long been employed to filter contaminants from gasoline as the gasoline is being pumped from an underground reservoir at a service station into the tank of a vehicle. In many cases, the filter includes a filter medium including a mechanical filtering media to remove particulates from the gasoline and a water-absorbing material to remove water from the gasoline. An example of such a filter is disclosed in commonly assigned U.S. Pat. No. 4,623,560 issued to William R. Ayers on Nov. 18, 1986, the entire disclosure of which is herein incorporated by reference.

In use, the water-absorbing material within the filter begins to swell as water is absorbed. As increasing amounts of water are absorbed, the swelling becomes more pronounced, causing the pressure drop across the filter medium to increase. The swelling ultimately causes the flow of gasoline through the filter to decrease.

As the flow of gasoline through the filter is decreased, the delivery of gasoline to the vehicle tank is slowed. The slowing of delivery of the gasoline, in turn, means that a particular pump will be tied up for a longer period of time to deliver a given quantity of gasoline. As a consequence, fewer customers can be accommodated, and the income of the service station will suffer.

Even if a customer complains to the operator of the service station about a slower than normal filling process, the person in charge may do nothing more than check to see that gasoline is flowing through the filter, without checking the rate of flow. This is particularly likely to occur where relatively untrained personnel are in charge of a service station operation, such as is the case, for example, with the so-called "mini-marts".

Even when trained personnel are involved in the process and take the time to check the rate of flow through the filter, determining when a filter is sufficiently plugged (i.e. that the rate of flow is too low) as to require replacement requires a relatively subjective judgment. It would, therefore, be highly desirable to have a filter that provides a positive indication when filter replacement is required. The present invention is directed to meeting that need.

BRIEF SUMMARY OF THE INVENTION

According to a first aspect of the invention, a filter includes a housing having an inlet and an outlet. A filter core including a filter media is movably disposed within the housing with the inlet and the outlet in fluid communication with opposite sides of the core and a pressure responsive surface in fluid communication with said inlet. The filter also includes a valve supported on the filter core and moveable into a sealing position to prevent fluid from passing to the outlet when said core moves within said housing response to fluid pressure acting against said pressure responsive surface.

The valve may include a shut-off tube disposed about the outlet, a sleeve valve reciprocally mounted on the shut-off tube and abutting the core, the sleeve valve moving along the shut-off tube towards the outlet when the core moves within the housing in response to fluid pressure acting against said pressure responsive surface, and a mechanism for biasing the sleeve valve away from the outlet disposed between a first surface on the shut-off valve and a second surface on the sleeve valve. Moreover, the mechanism for biasing the sleeve valve away from the outlet may be a spring and the second surface may have a groove formed therein to secure an end of the spring to the sleeve valve.

The filter core may include a wall with the outlet in fluid communication with one side of the wall, the inlet in fluid communication with the other side of the wall, and openings formed in the wall to allow for fluid communication between the one side and the other side of the wall. Moreover, the filter media may be disposed on the other side of the wall in fluid communication with the inlet, the filter media including a mechanical filtering media and a water-absorbing material.

According to another aspect of the invention, a filter includes a housing having a first end with an outlet and an inlet formed therethrough and a second, closed end. The filter also includes a filter core including a filter media, a wall with the inlet in fluid communication with one side of the wall and the outlet in fluid communication with the other side, and a surface facing the closed end of the housing which with the closed end of the housing defines a chamber therebetween in fluid communication with the inlet. A valve is supported on the filter core and is moveable into a sealing position to prevent fluid from passing to the outlet when the core moves in response to fluid entering the chamber.

The valve may include a shut-off tube disposed about the outlet, a sleeve valve reciprocally mounted on the shut-off tube and abutting the core, the sleeve valve moving along the shut-off tube towards the outlet when the core moves within the housing in response to fluid entering the chamber, and a mechanism for biasing the sleeve valve away from the outlet disposed between a first surface on the shut-off valve and a second surface on the sleeve valve.

The wall may have openings formed therethrough for fluid communication between the one side of the wall and the other side of the wall, and the filter medium may be disposed over the openings on the other side of the wall in fluid communication with the inlet. The filter medium may include a mechanical filtering medium and a water-absorbing material.

The surface of the filter core may include a rim which abuts the housing to limit the flow of fluid between the inlet and the chamber.

According to a further aspect of the invention, a filter includes a cylindrical housing having a first end with a central outlet and an inlet radially outwardly spaced from the outlet formed therethrough and a second, closed end. The filter also includes a filter core including a filter media, a cylindrical wall with the inlet in fluid communication with one side of the wall and the outlet being in fluid communication with the other side of the wall, and a surface attached to an end of the cylindrical wall facing the closed end of the housing which with the closed end of the housing defines a chamber therebetween in fluid communication with the inlet. A valve is supported on the filter core and is moveable into a sealing position to prevent fluid from passing to the outlet when the core moves in response to fluid entering the chamber.

The valve may include a shut-off tube disposed about the outlet, a sleeve valve reciprocally mounted on the shut-off tube and abutting the core, the sleeve valve moving along the shut-off tube towards the outlet when the core moves within the housing in response to fluid entering the chamber, and a mechanism for biasing the sleeve valve away from the outlet disposed between a first surface on the shut-off valve and a second surface on the sleeve valve.

The wall may have has openings formed therethrough for fluid communication between the one side of the wall and the other side of the wall, and the filter medium may be disposed over the openings on the other side of the wall in fluid communication with the inlet, the filter medium including a mechanical filtering medium and a water-absorbing material.

The surface may have a rim extending radially outward from the cylindrical filter core wall and abutting the housing, the rim being deformable to allow fluid to pass from the inlet between the rim and the housing into the chamber.

DETAILED DESCRIPTION OF THE INVENTION

Figure 1:
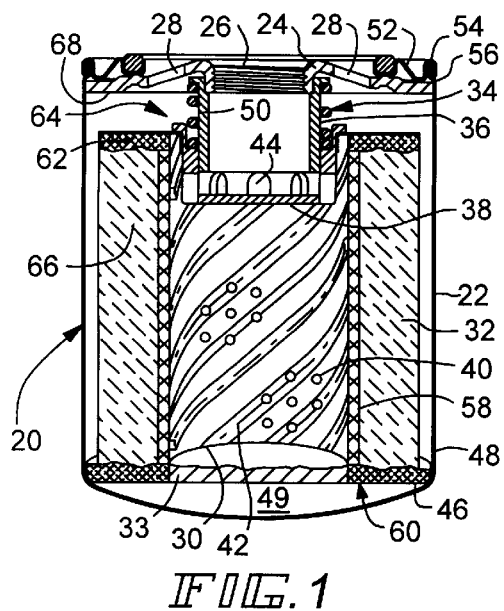
FIG. 1 is a cross-sectional view of a filter of the present invention having a shut-off valve.

An embodiment of the present invention for a filter is shown in FIG. 1. A filter 20 includes a cylindrical housing 22 with a first circular end plate 24 in which are formed a centrally located outlet 26 and angularly spaced inlets 28 located radially outward of the outlet 26. The filter 20 also includes a filter core 30 having a filter medium 32 disposed thereon. Both the core 30 and the filter medium 32 are located on an imperforate bottom element 33 of a diameter such as to just fit within the housing 22. The filter medium 32 will typically be that disclosed in the previously identified Ayers patent or otherwise include provision for removing water and particulates from the filtered liquid. The filter 20 further includes a valve 34 with an inner shut-off tube 36 on which a sleeve valve 38 is reciprocally mounted. The shut off tube 36 is disposed about and sealed to the outlet 26. The sleeve valve 38 is supported on the core 30.

In operation, contaminated or dirty fluid enters the filter 20 through the inlets 28. When the filter medium 32 is clean or unsaturated by contaminants or contaminant materials, the fluid passes through the filter medium 32 and openings 40 formed in the filter core 30. Passage of the fluid through the filter medium 32 removes the contaminants from the fluid. The fluid that has travelled through the filter medium 32 and the openings 40 in the filter core 30 enters a central region 42, from which it passes through openings 44 in the sleeve valve 38. Fluid flowing through the openings 44 in the sleeve valve 38 exits the filter 20 through the outlet 26.

As the filter medium 32 becomes progressively more and more saturated with contaminant materials, less and less fluid is able to pass through the filter medium 32 and the openings 40 in the filter core 30. As a consequence, the pressure drop across the filter medium 32 increases.

The filter core 30 is provided with a rim 46 which forms a gross seal with the wall 48 of the housing 22. When the pressure drop from the inlets 28 to the outlet 26 across the fluid medium 32 is sufficiently high, the rim 46 deforms under pressure or otherwise allows fluid to flow along the surface of the wall 48 between the wall 48 and the rim 46. The fluid passing along the surface of the wall 48 flows into a chamber 49 defined by the bottom 33 and the wall 48 of the housing 22. As will be seen, the bottom 33 acts as a pressure responsive surface.

As the fluid flows past rim 46 into the chamber 49, the fluid will be at the inlet pressure. Consequently, the fluid core 30 is lifted in the direction of the outlet 26 and inlets 28. The sleeve valve 38 is driven upwardly by the core 30 in the direction of the inner shut-off tube 36. As the filter core 30 moves further in the direction of the outlet 26 and the inlets 28, a wall 50 of the inner shut-off tube 36 occludes the openings 44 formed in the sleeve valve 38, thereby preventing the flow of fluid from the inlets 28 through the outlet 26. The resulting stoppage of flow provides an indication to the operator that the filter medium 32 is saturated with contaminants.

Figure 2:
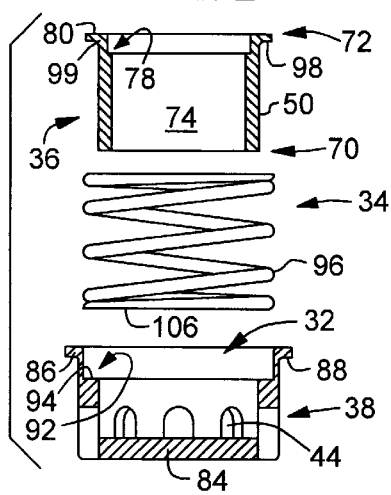
FIG. 2 is an enlarged, exploded cross-sectional view of a shut-off valve for use with the filter of FIG. 1, including a shut-off tube, a sleeve valve, and a spring.

Each of the element of the filter 20 is now discussed in greater detail with respect to FIGS. 1 and 2. The housing wall 48 and the first end plate 24 are preferably formed separately. The first end plate 24 is formed separately from the housing wall 48 so that the filter core 30, the filter medium 32, and the valve 34 may be disposed within a space defined by the housing wall 48, and then sealed therein by securing the first end plate 24 within the space. The first end plate 24 is held within the space through the use of a locking collar 52. The locking collar 52 has a rim 54 which includes a lock seam connection to a rim 56 of the housing wall 48.

The filter core 30 has a radially inner wall 58, which is preferably cylindrical in shape and coaxial with the cylindrical wall 48 of the housing 22. The rim 46 may be an elastomeric layer on the bottom 33 which extends radially outward from a lower, closed end 60 of the wall 58 to abut the housing wall 48. While the rim 46 is shown to be fabricated from a material other than that of wall 58, the wall 58 and the rim 46 may be formed integrally of a single material. The filter core 30 also has a second rim 62 along an upper end 64 of the wall 58. Again, the rim 62 is shown formed separately from and of a different material than the filter core wall 58. However, the filter core rim 62 may also be formed integrally with the filter core wall 58 and the first filter core rim 46. The filter rims 46, 62 define therebetween a cylindrical space 66.

The filter medium 32 is disposed within the cylindrical space 66 such that the filter medium 32 abuts the filter core wall 58 and covers the openings 40 formed in the filter core wall 58.

The valve 34 is shown disposed between the upper, open end 64 of the filter core 30 and a surface 68 of the first end plate 24. With specific reference to FIG. 2, it can be seen that the cap-shaped sleeve valve 38 and the collar-shaped inner shut-off tube 36 are both cylindrical in shape. The inner shut-off tube 36 has a first open end 70, a second open end 72 and a passage 74 defined therebetween by the wall 50. The inner shut-off tube wall 50 has a shoulder 78 and a surface 80 which abut and are sealed to the surface 68 of the first end plate 24. The sleeve valve 38 has an open end 82 and a closed end 84. About the open end 82 of the sleeve valve 38 is a rim 86 which extends outwardly radially, the rim 86 having a surface 88. The surface 88 of sleeve valve 38 abuts the upper end 64 of the filter core wall 58. As a consequence, movement of the filter core 30 also results in movement of the sleeve valve 38.

Figure 5:
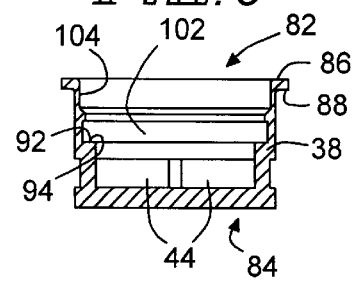
FIG. 5 is an enlarged, cross-sectional view of another embodiment of a sleeve valve for use with the valve shown in FIGS. 1–4, having a groove for retaining an end of a spring therein.

The sleeve valve 38 also has a shoulder 92 which defines a surface 94. A compression coil spring 96 is disposed between the surface 94 of the sleeve valve 38 and a surface 98 formed on a flange 99 on the inner shut off tube 36. Alternatively, as shown in FIG. 5, the sleeve valve 38 may have a grove 102 formed in an inner surface 104 thereof, an end 106 of the spring 96 being received and lockingly maintained in the groove 102 so that the sleeve valve 38 and the spring 96 form a one-piece unit. In operation, the spring 96 biases the sleeve valve 38 away from the inner shut off tube 36. As a consequence, the spring 96 also biases the sleeve valve 38 away from the outlet 26 which is adjacent to the second open end 72 of the inner shut off tube 36.

Figure 3:
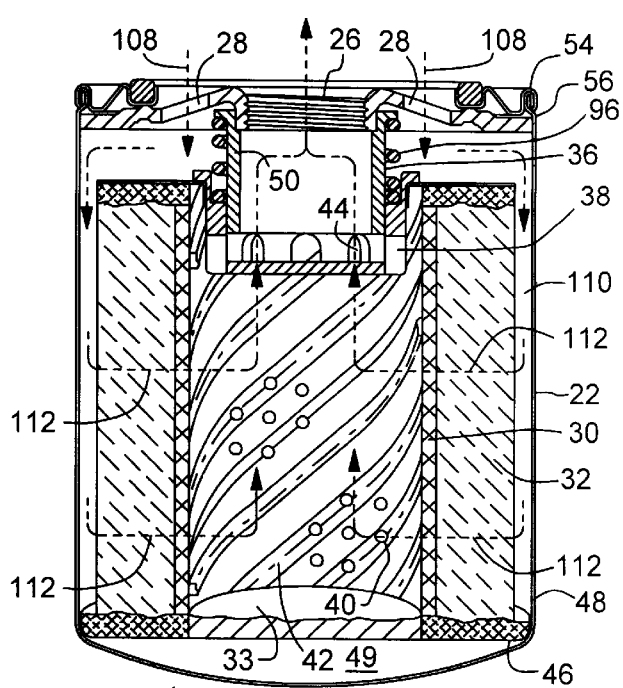
FIG. 3 is an enlarged, cross-sectional view similar to FIG. 1 showing the shut-off valve in an opening position.
Figure 4:
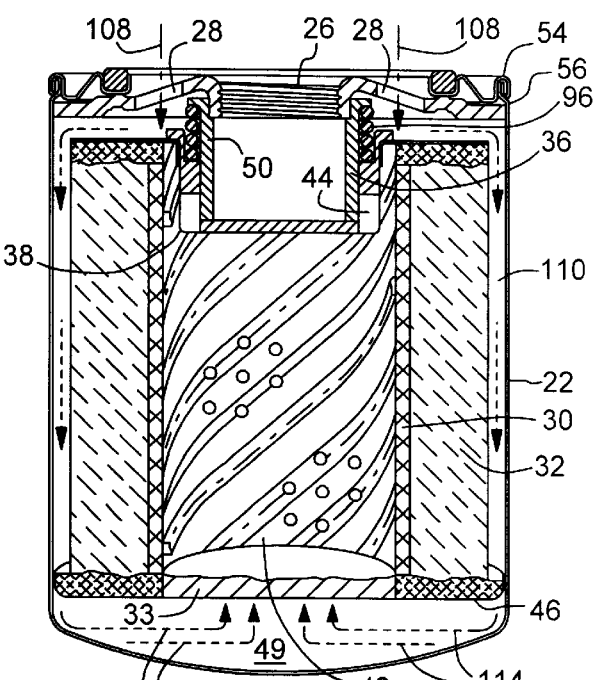
FIG. 4 is an enlarged, cross-sectional view similar to FIGS. 1 and 3 but showing the shut-off valve in a closed position.

With reference to FIGS. 3 and 4, the operation of the filter 20 may be explained as follows. A fluid enters the filter 20 through the inlets 28 in the direction of arrow 108. The fluid flows along a passage 110 which is adjacent to and in fluid communication with the filter medium 32.

The fluid entering the filter 20 may carry contaminant materials. For a fluid such as gasoline, the contaminant materials may include water and particulate material.

When the filter medium 32 is substantially free of contaminants, fluid flowing along passage 110 will pass through the filter medium 32 and openings 40 in the direction of arrow 112, entering the central region 42. The fluid will then flow through the openings 44 in the sleeve valve 38, and pass through inner shut off tube 36, from the first open end 70 through the passage 74 and out the second open end 72, into the outlet 26.

Once the filter medium 32 has become saturated with contaminant material, however, the fluid entering through the inlet 28 in the direction of arrow 110 is substantially prevented from flowing through the filter medium 32 and the openings 40 in the filter core 30. When the differential pressure between the inlet 28 and the outlet 30 exceeds a predetermined level, the rim 46 of the filter core 30 deforms so as to allow fluid to flow between the rim 46 and the wall 48 in the direction of arrow 114, entering the chamber 49.

The pressurized fluid flowing around the rim 46 and into the chamber 49 acts against the bottom 33 and causes the filter core 30 to move in the direction of the outlet 26 against the action of the spring 96. Specifically, the upper end 64 of the filter core wall 58 moves from a position spaced from the outlet 26 to a position proximate to the outlet 26. As a consequence of the movement of filter core 30, and in particular movement of the upper end 64 of the filter core 30, the sleeve valve 38, which has a rim 86 supported on the upper end 64 of the filter core wall 58, also moves from a position spaced from the outlet 26 to a position proximate to the outlet 26. As a further consequence, the sleeve valve 38 moves further onto the inner shut off tube 36 such that the wall 50 of the inner shut off tube 36 occludes the openings 44 formed in the sleeve valve 38, thereby preventing movement of fluid from the central region 42 through the openings 44 to the outlet 26.

It should be noted that the differential pressure at which the valve 34 closes off the outlet 26 may be adjusted by varying the modulus of elasticity of the spring 96, and thus the force opposing the rise of the filter core 30 within the housing 22. Preferably, the valve 34 closes off the outlet 26 when the differential pressure between the inlet and the outlet exceeds 25 psi.

The stoppage of fluid through the filter 20 provides an positive indication to the user that the filter medium 32 has become saturated with contaminants. Further, the contaminant-laden fluid entering through inlet 28 is prevented from flowing through the outlet 26 into the rest of the fluid circuit in which the filter 20 is disposed.

Still other aspects, objects, and advantages of the present invention can be obtained from a study of the specification, the drawings, and the appended claims.

We claim:

1. A filter comprising:

a housing having an inlet and an outlet;

a filter core mounted for movement within the housing with the inlet and the outlet in fluid communication with opposite sides of the core, the filter core having opposed ends, a filter media carried between the opposed ends and with opposed ends being movable as a unit relative to the housing, and a pressure responsive surface in fluid communication with said inlet;

a sleeve valve attached to the filter core and movable therewith into a sealing position to prevent fluid from passing to the outlet when the core moves within said housing in response to fluid pressure acting against said pressure responsive surface, said valve comprising a shut-off tube fixedly disposed about the outlet, said sleeve valve being reciprocally mounted on the shut-off tube and abutting the core, the sleeve valve moving along the shut-off tube towards the outlet when the core moves within the housing in response to fluid pressure acting against said pressure responsive surface;

a spring for biasing the sleeve valve away from the outlet disposed between a first surface on the shut-off valve and a second surface on the sleeve valve; and the second surface having a groove formed therein to secure an end of the spring to the sleeve valve.

2. A filter comprising:

a housing having a first end with an outlet formed therethrough and a second, closed end;

a filter core including a filter media, a wall with the fluid inlet in fluid communication with one side of the wall and the outlet in fluid communication with the other side of the wall, and a surface facing the closed end of the housing which with the closed end of the housing defines a chamber therebetween in fluid communication with the inlet; and a valve supported on the filter core and movable therewith into a sealing position to prevent fluid from passing to the outlet when the core moves in response to fluid entering the chamber;

the surface of the filter core including a rim which abuts and forms a gross seal with the housing to limit the flow of fluid between the inlet and the chamber.

3. A filter comprising:

a cylindrical housing having a central axis, a first end with an outlet disposed along the central axis and an inlet spaced radially outwardly from the central axis and a second, closed end;

a filter core mounted for movement within the housing and including a perforated cylindrical wall movable relative to the housing with the inlet in fluid communication with one side of the wall and the outlet being in fluid communication with the other side of the wall, a filter media carried on a radially outer surface of said perforated cylindrical wall for movement relative to the housing with said movable wall, and surface attached to an end of the cylindrical wall facing the closed end of the housing which with the closed end of the housing defines a chamber therebetween in fluid communication with the inlet; and a valve supported on the filter core and moveable therewith into a sealing position to prevent fluid from passing to the outlet when the core moves in response to fluid entering the chamber.

4. The filter according to claim 3, wherein the valve comprises:

a shut-off tube disposed about the outlet;

a sleeve valve reciprocally mounted on the shut-off tube and abutting the core, the sleeve valve moving alone the shut-off tube towards the outlet when the core moves within the housing in response to fluid entering the chamber; and means for biasing the sleeve valve away from the outlet disposed between a first surface on the shut-off tube and a second surface on the sleeve valve.

5. The filter according to claim 3, wherein the wall has openings formed therethrough for fluid communication between the one side of the wall and the other side of the wall, and the filter medium is disposed over the openings on the other side of the wall in fluid communication with the inlet, the filter medium including a mechanical filtering medium and a water-absorbing material.

6. A filter comprising:

a cylindrical housing having a first end with a central outlet and an inlet radially outwardly spaced from the outlet formed therethrough and a second, closed end;

a filter core including a filter media, a cylindrical wall with the inlet in fluid communication with one side of the wall and the outlet being in fluid communication with the other side of the wall, and a surface attached to an end of the cylindrical wall facing the closed end of the housing which with the closed end of the housing defines a chamber therebetween in fluid communication with the inlet; and a valve supported on the filter core and movable therewith into a sealing position to prevent fluid from passing to the outlet when the core moves in response to fluid entering the chamber, the surface having a rim extending radially outward from the cylindrical filter core wall and abutting and forming a gross seal with the housing, the rim being deformable allow fluid to pass from the inlet between the rim and the housing into the chamber.

7. A filter comprising:

a generally cylindrical housing having a cylindrical wall and opposite ends, one of said ends being closed and the other of said ends having a first port centrally of said other end and a second port disposed between said first port and said cylindrical wall;

a filter located within said housing to be reciprocal therein and having opposite ends, and a hollow, generally cylindrical filter media body, one of said filter ends being located adjacent said closed end and being imperforate, and a perforated media body support disposed within the filter media body and extending between said filter body ends;

a valve within said housing adjacent said first port and movable toward said first port to close said first port and away from said fist port to open said first port;

means biasing said valve away from said first port to open said first port; and said valve being engaged by the other end of said filter.

8. A filter according to claim 7 wherein said valve includes:

a shut-off tube disposed about said first port;

a sleeve valve reciprocally mounted on the shut-off tube and abutting said media body support, the sleeve valve moving along the shut-off tube towards the first port when the media body support moves within the housing and responds to fluid pressure acting against said one imperforate filter end; and said biasing means includes a spring interposed between said sleeve valve and said other housing ends.

9. The filter of claim 7 wherein said media body support is a generally cylindrical perforated core.

10. The filter of claim 9 wherein one of said ports is an inlet port and the other of said ports is an outlet port and said filter media body is disposed intermediate said core and said inlet port in the direction of fluid flow through said filter.

* * * * *